United States Patent [19]
May et al.

[11] 3,762,498
[45] Oct. 2, 1973

[54] GAS TURBINE EXHAUST SILENCER

[75] Inventors: Howard F. May, Schenectady; Michael C. Manna, Burnt Hills, both of N.Y.

[73] Assignee: General Electric Company, Schenectady, N.Y.

[22] Filed: July 22, 1971

[21] Appl. No.: 165,295

[52] U.S. Cl............................... 181/50, 181/33 HB
[51] Int. Cl........................................... F01n, E04b
[58] Field of Search.................. 181/33 HB, 42, 50, 181/33 K, 33 G, 30, 33 HC

[56] References Cited
UNITED STATES PATENTS

| | | | |
|---|---|---|---|
| 3,011,584 | 12/1961 | Lemmerman et al. | 181/33 HC |
| 2,915,791 | 12/1959 | Hauf | 181/33 G |
| 2,841,255 | 7/1958 | Kemp | 181/33 G |
| 3,421,273 | 1/1969 | Eckel | 181/33 GE |
| 2,519,162 | 8/1950 | Tucker | 181/42 |
| 2,674,335 | 4/1954 | Lemmerman | 181/50 |
| 2,674,336 | 4/1954 | Lemmerman | 181/33 G |
| 2,826,261 | 3/1958 | Eckel | 181/33 G |
| 2,918,984 | 12/1959 | Lemmerman | 181/33 G |
| 2,925,051 | 2/1960 | VanDerSlugs | 181/33 G |
| 3,491,849 | 1/1970 | Newkirk | 181/33 K |

FOREIGN PATENTS OR APPLICATIONS

| | | | |
|---|---|---|---|
| 1,208,482 | 9/1959 | France | 181/33 K |
| 357,147 | 9/1931 | Great Britain | 181/50 |
| 670,930 | 4/1952 | Great Britain | 181/33 HC |
| 38,100 | 6/1956 | Poland | 181/33 HB |

Primary Examiner—Richard B. Wilkinson
Assistant Examiner—Pat Salce
Attorney—William C. Crutcher et al.

[57] ABSTRACT

A silencer device for a gas turbine exhaust including a modular, box-like outer structure into which hot gases from the exhaust end of a gas turbine are directed. The interior construction of the device includes two 180° turns, in series, interconnected by transition passageways. Further included, as part of the interior construction, is an acoustical and thermal insulation throughout the silencer which is comprised of layers of fibrous material covered with perforated sheet metal. Provision is made for possible waste heat recovery applications.

3 Claims, 5 Drawing Figures

FIG.1

PATENTED OCT 2 1973 3,762,498

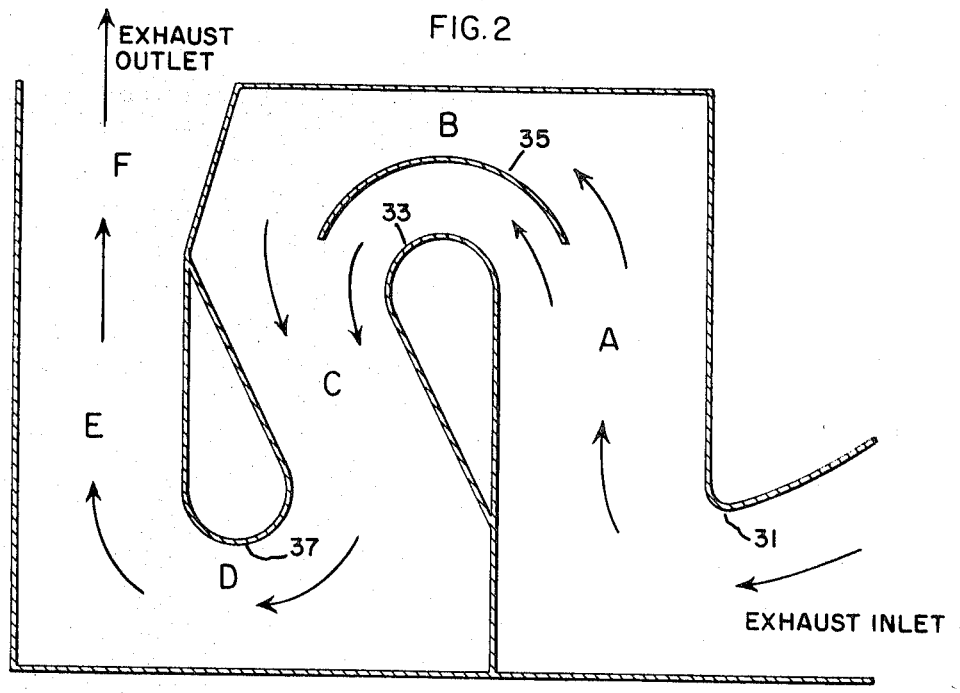
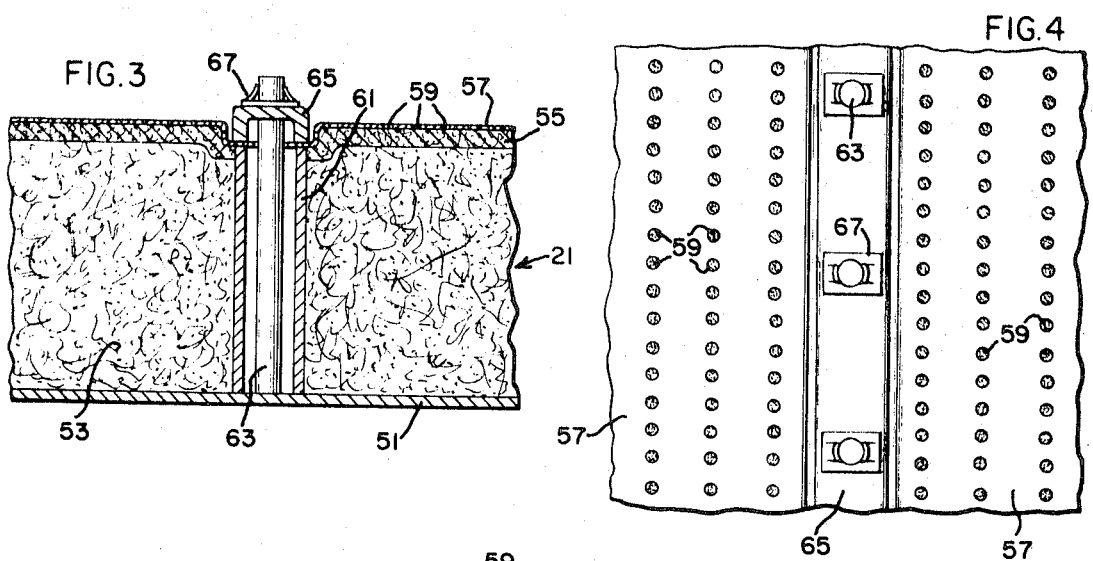
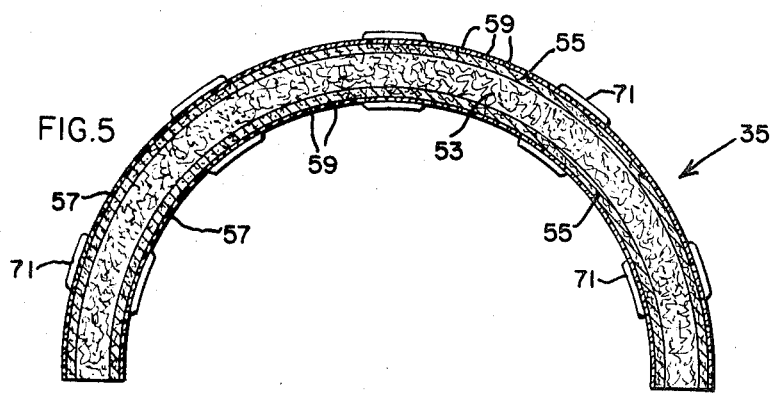

GAS TURBINE EXHAUST SILENCER

BACKGROUND OF THE INVENTION

This invention relates generally to noise abatement in rotating turbo machinery and, in particular, to the construction of a silencer device for a gas turbine exhaust.

The quality of our environment has become the focus of legislative and public attention in recent years. Concern is voiced about the poor quality of our air and water. Additionally, some concern is being directed at the amount of unwanted sounds or noises in our environment.

Sounds are caused by disturbances of air masses. Such disturbances may be caused by rotating machinery such as compressors and turbines. It is increasingly difficult to find large open spaces which could provide a natural silencing effect. It is difficult to plan sites which would be large enough to aesthetically accommodate oversized silencing equipment such as long, acoustically prepared boxes. Therefore, it has become a challenge to industry to produce a compact and effective silencer.

Such a silencer must deal with several parameters. One parameter is that since silencing equipment does not produce anything but quiet; to be attractive to prospective customers, it must be inexpensive to fabricate. Another parameter, associated with the first parameter, is that in order for construction and shipping costs to remain minimal, it would be desirable to provide a modular construction which would be factory prepared and easily assemblable on the field site. Another parameter is that pressure losses through the silencer must be minimized and also the structure must be compact, which results in a circuitous flow path and consequently the flow path must be contoured to minimize pressure losses. Finally, the acoustic packing must be sound absorbing but able to withstand hot exhaust temperatures and high velocities without abrading or shredding.

OBJECTS OF THE INVENTION

Accordingly, it is one object of this invention to provide a gas turbine exhaust silencer which will provide maximum noise attenuation with minimal pressure losses.

It is another object of this invention to provide a gas turbine exhaust silencer which may have separate factory prepared modules for easy shipping anf field erection.

It is another object of this invention to provide a gas turbine exhaust silencer which will have minimum overall dimensions.

It is another object of this invention to provide a gas turbine exhaust silencer which is both thermally and acoustically insulated.

Other objects, advantages and features of the present invention will become apparent from the following detailed description of an embodiment thereof taken in connection with the accompanying drawings.

BRIEF DESCRIPTION OF THE DRAWINGS

FIG. 2 is a diagrammatic representation of the exhaust gas flow through the silencer.

FIG. 3 is an elevation cross-section view of a portion of the acoustical packing.

FIG. 4 is a plan view of a portion of the acoustic packing.

FIG. 5 is an elevation cross-section view showing one way of mounting the acoustic packing into the silencer device.

SUMMARY OF THE INVENTION

A gas turbine exhaust silencer is provided at the exhaust end of a gas turbine comprising a modular box-like structure having an interior switchback exhaust flow path. The entire interior including the exhaust flow path is acoustically and thermally insulated by acoustic paneling comprising a multilayer insulation enclosed between perforated steel sheets. The modular portions may be factory prepared and then shipped to the site for easy field erection. A cutout portion may be provided for waste heat recovery applications.

DETAILED DESCRIPTION OF THE INVENTION

Figure 1:
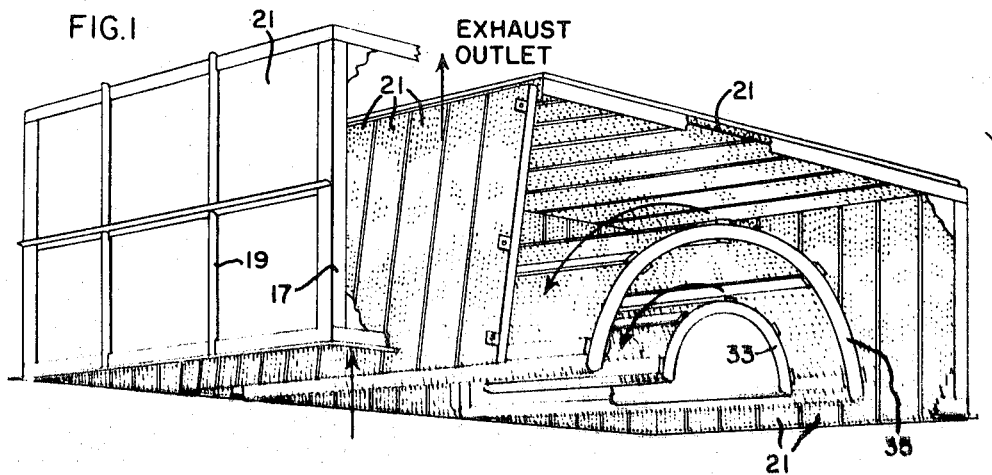
FIG. 1 is an exploded, partially cutaway isometric view of the gas turbine exhaust silencer illustrating the modular application of the present invention.
Figure 1:
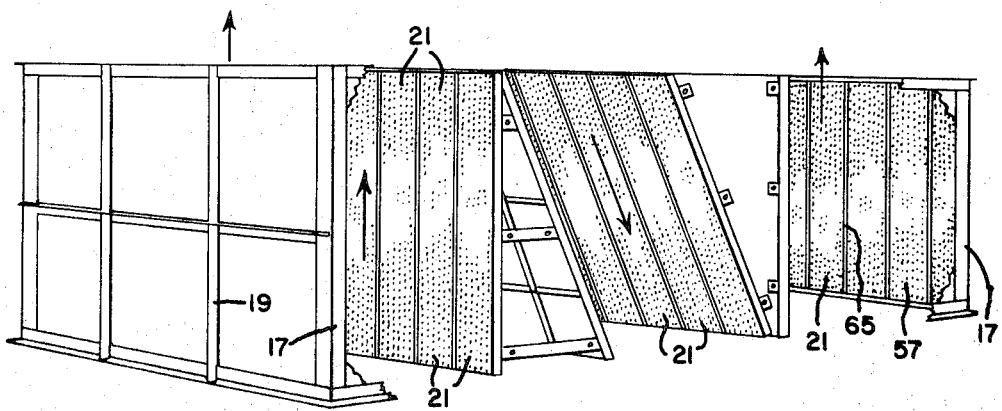
Figure 1:
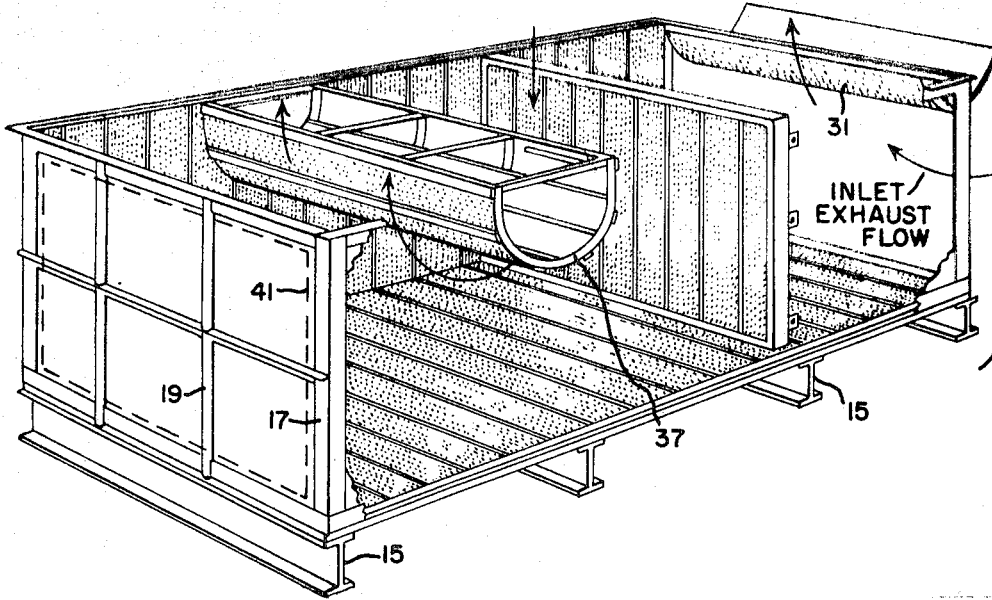

A gas turbine exhaust silencer is best shown in FIG. 1 when taken in connection with the diagrammatic view FIG. 2. The silencer is a box-like structure generally shown at 11, having an exhaust inlet and an exhaust outlet as labeled in the drawings. The construction of the silencer is such that a plurality of flanged beams 15 support structural members 17 and bracing members 19 to form an outer frame for the silencer. The interior of the silencer is acoustically and thermally insulated by panel sections 21. These panel sections form the walls of the silencer as they are supported by the bracing and structural members. Further, these panel sections form the interior flow path of the silencer.

The modular characteristic of the device is illustrated in FIG. 2 wherein there are shown three modular sections. When it is desired to employ modular construction, each separate module is shipped to the site with factory prepared acoustic and thermal insulation. Thereafter, the modules are simply bolted together at their respective structural members.

The flow path of the hot exhaust gases is shown best in FIG. 2. the hot exhaust gases pass through the exhaust gas inlet section which has a rounded upper portion 31, as shown. This rounded upper portion reduces the pressure losses at the exhaust inlet and further imparts an upward turn to the gas flow. The gas flows upwardly through transition A which connects the exhaust inlet with a first bend B.

The first bend B is comprised of a nose 33 and a flow divider vane 35. The bend B reverses the flow of gas approximately 180°. The nose 33 is significant in reducing pressure losses through the bend because the energy distribution of the gas flow has been shifted to the nose because of the upward turn the incoming hot gas must make as it enters the exhaust inlet. The nose, of course, is acoustically and thermally insulated.

The flow divider vane 35 is acoustically significant in that it presents sound energy absorbent surfaces on both sides of the vane thereby resulting in a large acoustically absorbent area in a comparatively small space requirement. In other words, the overall dimensions of the silencer are not greatly increased while maximum sound attenuation is provided.

Another acoustic feature of the bend is that it eliminates a line of sight for the travel of sound energy. Simply stated, sound travels in straight lines, and the curved bend attenuates the noise by forcing the sound through a circuitous path.

Another transition C connects bend B with a second bend D. The sidewalls of the transition are slanted from the vertical in order to conserve the overall vertical height of the silencer. This transition is also formed from acoustical panels and therefore causes further noise reduction.

Bend D may include just a nose 37 although a flow divider may also be provided for further sound attenuation. Bend D may be used for again reversing the hot exhaust gas flow path 180°.

Transitions E and F are used in directing the flow of gases to the atmosphere, the latter transition having a divergent sidewall to reduce pressure losses at the exhaust outlet.

The dotted portion 41, shown in FIG. 1, represents a cutout which may be used in heat recovery operations by providing an alternate passageway to a waste heat recovery steam generator while using the transitions E and F for a bypass. In this case, the second bend does not completely reverse the flow 180° but rather turns it approximately 90°.

INSULATION

The insulation must be both acoustically absorbing and heat-resistant. The construction of the acoustic packing is shown in detail in FIGS. 3 and 4. All of the interior surfaces of the silencer are formed with acoustic paneling, including the flow path as well as the wall structure.

The acoustic paneling, shown generally at 21, is formed with a carbon steel layer 51. This layer may be in the order of a ¼ inch thickness and forms the outer or back portion of the acoustic paneling.

A first insulation layer 53, of relatively inexpensive fibrous material, is placed adjacent the carbon steel layer. This layer may be in the order of three inches in thickness and may be either a mineral wool or a fiberglass, the latter being preferred.

Adjacent this first insulation layer is a second insulation layer 55 comprising a very high-temperature insulation such as a long-fibered ceramic felt. This layer may be ¼ inch in thickness. Besides providing acoustic and thermal insulation, this insulation layer resists the high temperatures of the exhaust gases while exhibitng good felting characteristics at temperature and preventing loss of expensive insulation due to high velocities and buffeting.

Finally, a micro thin, perforated stainless steel sheet 57 is positioned adjacent the second insulation layer. This sheet is approximately 0.03 inch in thickness and the perforations 59 are approximately 0.045 inch diameter holes. These holes are arranged so that 20 percent of the material is removed. The 20 percent open area is sufficient to make the perforated sheet transparent to sound, thus allowing noise to pass into the insulation and become absorbed. These holes, however, are small enough to prevent loss of insulation through them. In addition, the thinness of the perforated metal allows localized buckling which accommodates thermal differentials from inside to outside.

The paneling is held intact by means of a pipe spacer 61, around a stud 63 anchored to the carbon steel layer, which maintains the thickness of the paneling against compression, a channel section 65 which keeps the panel from pulling apart and spring clips 67 which lock the channels on the studs. The studs may be placed at 18 inch centers.

One construction feature of the present invention is shown in FIG. 5 as part of the bend B. However, this manner of construction may be used throughout if it is so desired. Slats 71 are fixed to the walls of the silencer and run so that they form a track into which the acoustic paneling may be slidably mounted. Such a construction allows thermal expansion of the acoustic paneling while providing a simple and secure mounting system. As is also apparent from FIG. 6 which represents the flow dividing vane 35 both surfaces are provided with a thin perforated sheet metal layer. This allows double the sound-absorbing area for the flow divider as was previously mentioned.

From the preceding detailed description, it should be apparent as to why this silencing device may be called a switchback silencer. In a limited overall construction, there has been provided a maximum acoustic absorbing area, while pressure losses are conserved. The flow path of the hot gases is reversed 180° twice, so that line of sight travel of sound is also avoided.

While there is shown what is considered to be, at present, the preferred embodiment of the invention, it is, of course, understood that various other modifications may be made therein; such as, addition of further flow dividing means or further pressure loss conserving steps or the use of different types of insulation. It is intended to cover in the appended claims all such modifications as fall within the true spirit and scope of the invention.

What is claimed is:

1. In combination with a silencing device for receiving high velocity, high temperature exhaust gases including an acoustically absorbent flow path disposed within a support frame; an acoustically absorbent, flow divider vane disposed within the flow path comprising:
   a relatively thick, acoustically absorbent, sound insulation layer disposed between a pair of relatively thin, acoustically absorbent, heat resistant layers; said sound insulation layer and said heat resistant layers disposed between a pair of micro-thin, acoustically transparent, perforated metal layers;
   means for retaining said layers in a sandwiched relation including a spacer sleeve having each end abutting an opposite metal layer; a stud passing through said sleeve and each metal layer; fastening means outside said metal layers at each end of said stud; and,
   means for slidably supporting said flow divider vane in said flow path including a plurality of parallel slots, disposed across said flow path, forming a curvilinear track whereby said flow divider vane is permitted to expand and contract.

2. The flow divider vane, recited in claim 1, wherein said sound insulation layer is formed of a fibrous material such as fiberglass.

3. The flow divider vane, recited in claim 1, wherein said heat resistant layers are formed of ceramic felt.

* * * * *